United States Patent [19]
Higdon

[11] Patent Number: 5,093,748
[45] Date of Patent: Mar. 3, 1992

[54] PORTABLE ROTATING BATHROOM MIRROR

[75] Inventor: Joel W. Higdon, Laguna Beach, Calif.

[73] Assignee: Higdon Mirror Corporation, Santa Ana, Calif.

[21] Appl. No.: 602,518

[22] Filed: Oct. 24, 1990

[51] Int. Cl.⁵ .................... G02B 5/08; G02B 7/182
[52] U.S. Cl. .................... 359/508; 248/467; 248/472
[58] Field of Search ............ 350/583, 320; 248/467, 248/472

[56] References Cited

U.S. PATENT DOCUMENTS

| | | |
|---|---|---|
| 1,761,393 | 6/1930 | Hoegger . |
| 2,352,819 | 7/1944 | Winslow . |
| 2,737,852 | 3/1956 | Porter et al. . |
| 2,948,912 | 8/1960 | Wisdom . |
| 2,968,995 | 1/1961 | Holden . |
| 3,045,551 | 7/1962 | Bonanno . |
| 3,347,004 | 10/1967 | Allen . |
| 3,711,179 | 1/1973 | Takeda . |
| 4,136,925 | 1/1979 | Menzies et al. . |
| 4,225,212 | 9/1980 | Grabowski . |
| 4,261,637 | 4/1981 | King . |
| 4,273,418 | 6/1981 | Gillespie et al. . |
| 4,320,937 | 3/1982 | Schuwerk . |
| 4,365,867 | 12/1982 | Siefert ........................ 350/637 |
| 4,536,064 | 8/1985 | Schindel et al. . |
| 4,561,732 | 12/1985 | Japes ........................ 350/584 |
| 4,792,198 | 12/1988 | Sherwood . |
| 4,950,065 | 8/1990 | Wyman . |

FOREIGN PATENT DOCUMENTS

| | | | |
|---|---|---|---|
| 17736 | 2/1981 | Japan | 350/583 |
| 191140 | 11/1982 | Japan | 350/583 |

*Primary Examiner*—Jon W. Henry
*Attorney, Agent, or Firm*—Knobbe, Martens, Olson & Bear

[57] ABSTRACT

The present invention provides for a portable water resistent rotating mirror device which may be conveniently affixed to a bathroom wall or placed on a counter surface and which prevents the accumulation of moisture on a rotating mirror in a high moisture environment such as hot showers or saunas. The device comprises a water resistent housing having a generally hollow interior for containing a battery-powered motor which can be activated with a water resistent control switch mounted on a front portion of the water resistent housing. The motor is directly connected to the mirror so that actuation of the motor in turn rotates the mirror at high angular velocities. Attached to the back of the water resistent housing is a suction cup which can be affixed to a vertical wall by compressing the device against the wall. In addition, a pivotal bracket is connected to the lower, rear portion of the water resistent housing. The bracket may be pivoted outwardly to provide a means for supporting the device on a substantially flat counter.

9 Claims, 3 Drawing Sheets

PORTABLE ROTATING BATHROOM MIRROR

FIELD OF THE INVENTION

This invention relates generally to rotating mirrors and more specifically to a water resistent housing containing a battery-powered rotating mirror for centrifugally removing moisture accumulation from the mirror.

BACKGROUND OF THE INVENTION

As is commonly known, the process of showering in a bathroom setting often results in a high-moisture environment, making it difficult for a bather to see a visible reflection in the bathroom mirror. A similar problem exists for those in or near a sauna. Over the years, many people have attempted to shave in such a "steamy" environment without suffering cuts attributable to an inability to see exactly where they are shaving. In addition, those attempting to apply face make up suffer the frustration of sloppy applications when they cannot see a clear reflection. While some have mastered the technique of shaving or applying makeup without the need to see the features of their face during the process, others depend on a clear reflective surface to guide them. Following hot showers or saunas, this dependence generally involves the frustrating process of clearing the bathroom mirror of any moisture buildup for a period sufficiently long enough to permit effective shaving or makeup application. However the resultant steam from a hot shower or sauna persists in condensing on the mirror for quite some time after the shower has ended. This continual "fogging" of the mirror makes it difficult to maintain a clear reflective view. The person shaving or applying makeup must continuously wipe the mirror clean of moisture buildup and hope that it remains clear long enough to make a few more passes with the razor or makeup applique.

For those shavers who wish to dispense with the double process of showering and then shaving, these people combine their efforts and thereby shave in the shower. Unfortunately, those people who can effectively shave without a mirror are in the minority. As such, most people desiring to shave in the shower must bring a mirror in the shower with them. There are devices which appear to address the need for having a mirror in the shower. For example, the patent to Wyman, U.S. Pat. No. 4,950,065, discloses a reflective device which can be conveniently supported from a bathroom wall. As one would expect, however, the moisture buildup problem identified above, is exasperated when the shower is in progress because the steam is continuously being generated by the hot shower. Consequently, the mirror fails to provide an adequately clear reflective surface with which one can see to shave.

Whether one desires to shave or apply makeup in the bathroom following a hot shower or sauna, or one desires to shave directly in the shower, there are devices which address the problem of moisture buildup. In some cases, the above problem may be overcome by directly applying soapy water to the mirror followed by a rinsing off of the soap. While this process generally provides an adequately clear reflection, the process is sloppy at best. In addition, the streams of water remaining from the rinsing process often distort the reflected view. Another means for overcoming the problem of shaving or applying makeup in a steamy environment is the application of a defogging material to the mirror which prevents, to some degree, moisture accumulation on the mirror surface. However, even with this approach, the ability to prevent moisture accumulation often fails to be effective for sufficiently long periods or during multiple shaving periods. As a result, a person must reapply a defogging material on a continuous basis. In addition, if one does not have a defogging material readily available, as when traveling, they are precluded from shaving in the shower or must wait until after the bathroom clears of steam.

It would therefore be a novel improvement to provide a mirror which provides the ability to maintain a clear reflective surface in high-moisture environments associated with hot showers or saunas. The rotating mirror concept has been disclosed in other high-moisture environments, but not in the shower or sauna environment. For example, the patent to Wisdom, U.S. Pat. No. 2,948,912, discloses a rotating mirror for use in the dental field. In addition, the patents to Schuwerk, U.S. Pat. No. 4,320,937, and Grabowski, U.S. Pat. No. 4,225,212, among others, each disclose a rotating mirror for use as automobile rear view mirrors. However, the above devices are limited in that they are not suitable for bathroom use where one desires to shave in a steamy environment. In addition, none disclose a portable water resistent housing which may be affixed to a bathroom wall or placed on a bathroom counter in a self-sustaining position. As a result, it would be a novel improvement to provide a portable, water resistent rotating mirror for use in a shower or sauna during high-moisture periods which is actuated by a battery-powered motor disposed within a lightweight mirror housing. With such an improvement, a person would be provided with a hands-free means for ensuring that a clear reflective surface is maintained on a mirror without the need of defogging material or continuously wiping the mirror clear of condensation. In addition, the person need not wait until the bathroom or sauna clears of steam before beginning to shave or apply makeup.

SUMMARY OF THE INVENTION

The present invention provides for a portable water resistent rotating mirror device which may be conveniently affixed to a shower wall or bathroom wall or may be placed upright on a counter surface. The device provides a portable rotatable mirror which prevents the accumulation of moisture on the mirror in a high moisture environment such as hot showers or saunas.

Especially suited for high-moisture environments, the rotating mirror device of the present invention comprises a water resistent housing having a generally hollow interior for containing interior mechanical and electrical components. Disposed within the housing is a battery-powered motor which can be activated with a water resistent control switch mounted on a front portion of the water resistent housing. The motor is directly connected to the mirror so that actuation of the motor in turn rotates the mirror. While the motor and the batteries which power the motor are contained within the device housing, they are sufficiently protected from the high-moisture environment by various seals provided throughout the device.

The water resistent housing is self-supporting and may be positioned by a user on a bathroom wall or on a horizontal counter surface. Attached to the back of the water resistent housing is a suction cup which can be affixed to a vertical wall by compressing the device against the wall. In addition, a pivotal bracket is connected to the lower, rear portion of the water resistent housing. The bracket may be pivoted outwardly to provide a means for supporting the device on a substantially flat counter. As such, when a person desires to shave or put on makeup during or following a hot shower or sauna, he or she need merely affix the present invention to the bathroom wall, including the shower wall, or on a bathroom counter. Other advantages of the present invention may be appreciated by reference to the accompanying drawings and detailed description.

DETAILED DESCRIPTION OF THE INVENTION

Reference is now made to the figures wherein like parts are designated with like numerals throughout.

Figure 1:
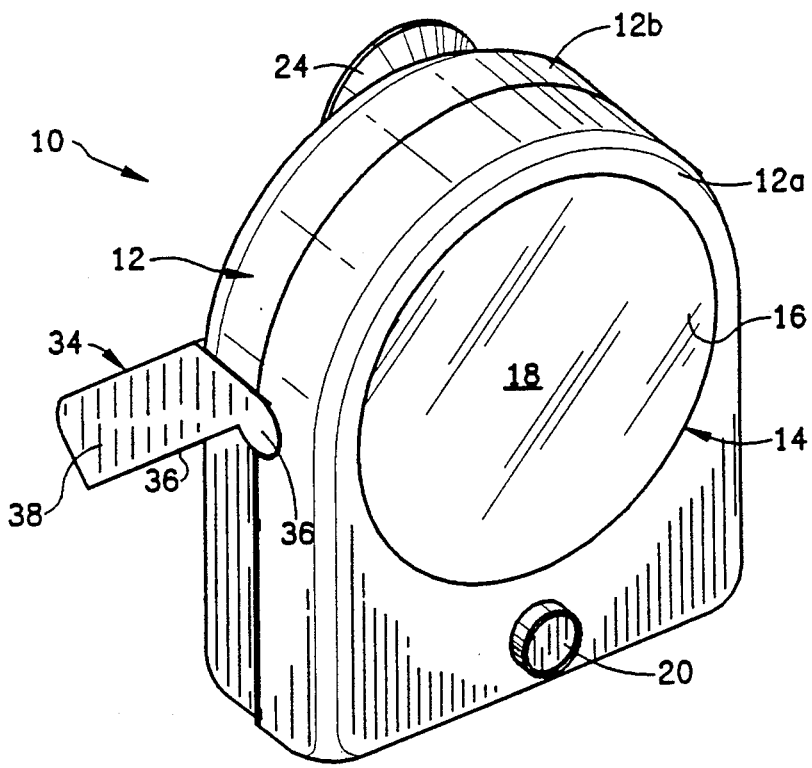
FIG. 1 is a perspective view of the present invention shown standing on a horizontal surface.

Referring to FIG. 1, the present invention comprises a portable device 10 for eliminating the accumulation of moisture on a reflective surface. The portable device 10 is especially suited for high-moisture environments such as hot showers and saunas. In the preferred embodiment, the device 10 comprises a water resistent housing 12 having a front section 12a and a rear section 12b which is tightly sealed to form housing 12. Disposed within the front housing section 12a is a recess 14 in which a rotatable reflective plate 16 is positioned. The reflective plate 16 has an outerwardly-directed surface 18 having a reflective material covering substantially the entire reflective surface 18 of the reflective plate 16, such as a conventional mirror, which is preferably flat in order to present a proportional reflection. However, the reflective surface 18 may alternatively have a concave configuration for enlarged, close-up reflections.

The reflective plate 16 is rotatable within the housing 12 and is driven by a battery-powered motor (not shown). The motor can be actuated by a control switch 20 positioned on the lower portion of the front housing section 12a. The control switch 20 is preferably of the type which may be pushed inwardly a first time in order to activate the motor and which may be pushed inwardly a second time in order to deactivate the motor. A more detailed description of the preferred control switch 20 is provided below. However, it is to be noted that any type of control switch will be effective to operate the battery-powered motor.

The portable device 10 effectively provides a means for removing moisture buildup on the reflective plate 16 by spinning the reflective plate 16 at substantially high speeds of rotation. Such rotational action provides a centrifugal force which, upon sufficient rotational speeds, directs moisture on the reflective plate 16 radially outward and off the reflective plate 16. In the preferred embodiment, the motor rotates the reflective plate 16 about a center of rotation and at angular velocities above 5,000 revolutions per minute (RPM), although lower velocities of 1,000 RPM are also effective.

Figure 2:
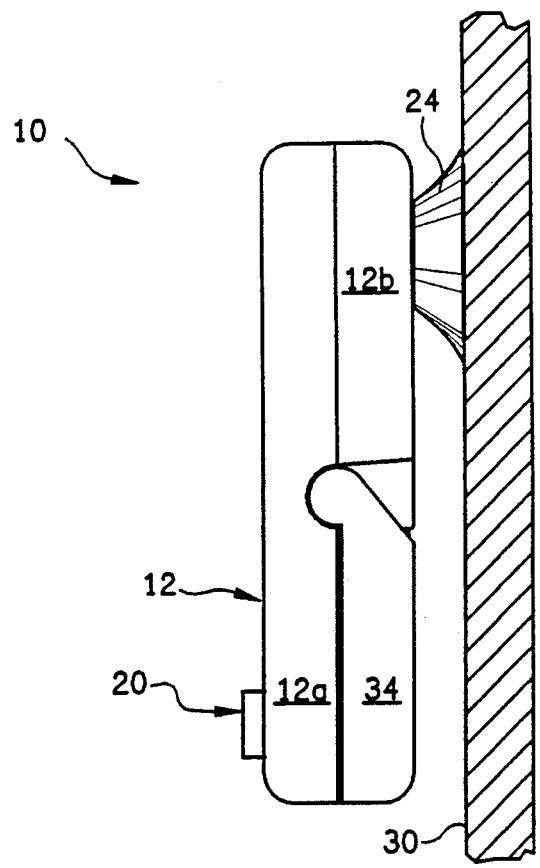
FIG. 2 is a side view of the present invention shown affixed to a vertical surface.

Advantageously, the portable device 10 may be used in a bathroom environment either by affixing the device 10 to a vertical wall or by placing the device 10 on a horizontal counter surface. In FIG. 1, the means for permitting the device 10 to be placed in a hands-free position is shown. Attached to an upper portion of the rear housing section 12b is a suction cup 22 which permits the device 10 to be affixed to a vertical surface. In FIG. 2, the device 10 is shown affixed to a vertical surface 24 which may be accomplished by pressing the upper portion of the housing 12 against the vertical surface 24 so as to compress the suction cup 22. Compression of the suction cup 22 evacuates the air between the suction cup 22 and the vertical surface 24, thereby maintaining the device 10 in this desired position under the influence of suction or negative pressure. With this arrangement, a user can position the device 10 on a bathroom wall at a height substantially equal to the user's head and at a location conveniently accessible while shaving. By activating the rotatable reflective plate 16, the condensation which normally accumulates on the reflective plate 16 during or after hot showers is centrifugally removed by the spinning action, thereby providing a clear reflection in the reflective plate 16.

Referring momentarily back to FIG. 1, an alternative support means is illustrated which permits the device 10 to be placed in a substantially upright orientation on a horizontal surface. Attached to the lower portion of rear housing section 12b is a pivotal bracket 26 which pivots about a pivot pin 28 located on either side of housing 12. The pivotal bracket 26 consists of a generally flat panel 30 having curved sides which conform to the configuration of the lower portion of rear housing section 12b. It is to be noted that the bracket 26 need not be a flat panel, but may alternatively comprise three orthogonally-connected leg members wherein the middle leg member functions as a base to support the device 10 on a horizontal surface. When not in use, the bracket 26 may be rotated inwardly toward the housing 12 so that it fits snugly about the lower portion of the rear housing section 12b, as shown in FIG. 2. When it is desired to support the device 10 on a horizontal bathroom counter, the bracket 26 may be rotated outwardly so that the base of the flat panel 38 and the base of the housing 12 provide a means for stabilizing the device 10 in a substantially upright orientation, as shown in FIG. 1.

Figure 3:
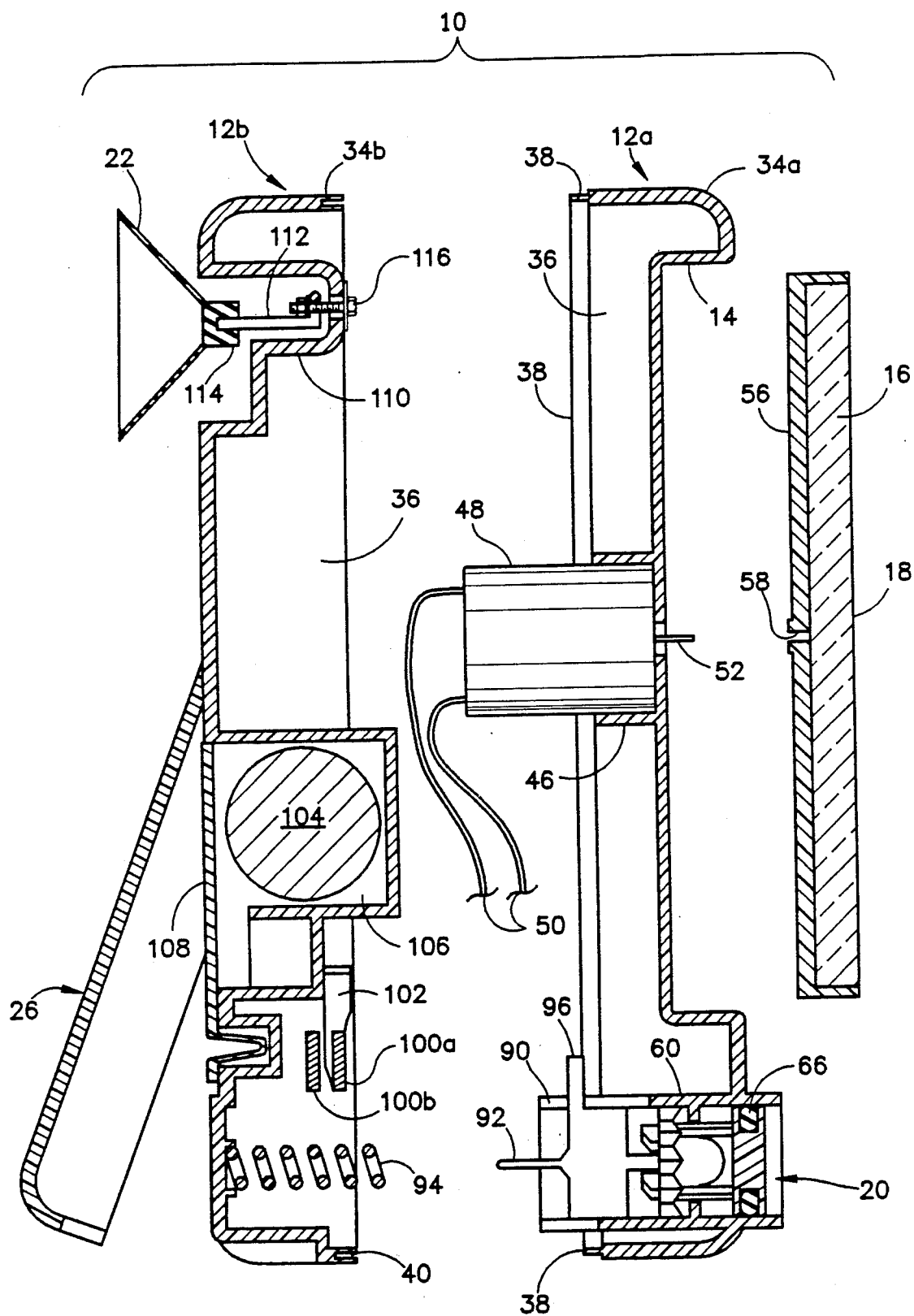
FIG. 3 is an exploded cross-sectional view of the present invention taken along line 3—3 in FIG. 1.

Reference is now made to FIG. 3 which shows the internal components of the device 10. There it is shown that the device 10 is defined by the rear housing section 12b and the front housing section 12a, shown disassembled and in cross-section. The housing sections 12a and 12b generally comprise rigid panels 34a and 34b, respectively, which are configured to provide an interior space 36 in which the internal components are disposed when the panels 34a, 34b are assembled. Integral with the perimeter of front panel 34a is a flange 38 which is slidably engagable with a grooved recess 40 of rear panel 34b to snugly and sealably secure the panels 34a, 34b together in a water resistent manner. In an alternative embodiment, a gasket is inserted between the flange 38 and the grooved recess 40 to provide a water resistent connection. The two panels 34a and 34b may be locked in place by a plurality of mechanical connectors, such as screws (not shown). With this arrangement, the interior 36 of the housing 12 is protected against damage from moisture infiltration.

Disposed within the interior 36 of front panel 34a is an electric motor compartment 46 comprising a cylindrical space within which an electric motor 48 can be mounted. Connected to the electric motor 48 are electrical lead wires 50 which provide electrical power from batteries (described below) housed within the rear panel 34b. Extending outwardly from the front of the motor 48 is a drive shaft 52 for a press fit connection to the reflective plate 16. The drive shaft 52 is centrally disposed within the recess 14 of the front panel 34a; the recess 14 being circularly shaped to receive the rotatable reflective plate 16 (shown disassembled from the device 10). The drive shaft 52 is connectable to the reflective plate 16 by means of a plate cover 56 having a central aperture 58 for receiving the drive shaft 52. The cover 56 is configured to envelop the rear and side portions of reflective plate 16 thereby leaving only the reflective surface 18 outwardly exposed. While the outer diameter of the cover 56 is less the inner diameter of the recess 14 in order to permit free rotation, the resulting space is preferably small to minimize the infiltration of moisture behind the cover 56. In the preferred embodiment of the device 10, when the cover 56 is placed in its operable position about the drive shaft 52, an outer surface of the reflective plate 16 is preferably aligned flush with, or extends outwardly from, the front exterior surface of the front housing panel 34a. With such an arrangement, the moisture adhering to the reflective plate 16 may be centrifugally removed during operation without significant accumulation of moisture about the perimeter of the recess 14.

In the preferred embodiment, the diameter of the central aperture 58 is slightly smaller than the diameter of the drive shaft 52 so that a press fit is provided when the drive shaft 52 is inserted within the central aperture 58. By providing a press fit about drive shaft 52, the frictional engagement between the inner surface of the central aperture 58 and the outer surface of the drive shaft 52 provides a mechanical connection therebetween. As such, rotation of the drive shaft 52 in turn rotates reflective plate 16. In addition, the press fit prevents damage associated with moisture exposure to the motor 48 through central aperture 58.

In an alternative embodiment, the motor drive shaft is non-aligned with the aperture 58 of the cover 56, so that a separate shaft (not shown) extends inwardly from the aperture 58. The drive shaft 52 and the separate shaft are indirectly linked via a belt and pulley assembly or an intermeshed gear assembly. In still a further embodiment, there is no mechanical connection provided between the motor 48 and the cover 56. Rather, a magnetic coupling is utilized to magnetically drive the rotation of the reflective surface 16. It is contemplated that one of the compatible components is secured to the motor while the other of the compatible components is secured to the cover. With such an arrangement, rotation of the reflective surface 16 may be accomplished without penetrating the recess 14 of the front panel 34a which further enhances the water resistent capability of the portable device 10.

Provided at the lower portion of front panel 34b is a cylindrical switch housing 60, integral with front panel 34a, which houses the control switch, generally designated 20. Still referring to FIG. 3, the control switch 20 is shown in an "OFF" position. At the front end of control switch 20 is a spring-actuated button 62 having an annular recess 64 about the perimeter of the button 62 for receiving an O-ring gasket 66. The diameter of the gasket 66 is slightly larger than the inner diameter of the switch housing 60 so that a water resistent seal is provided about the circumference of control switch 20. The seal prevents the passage of moisture to the interior 36 of device 10, thereby protecting the interior components of the device 10.

Figure 4:
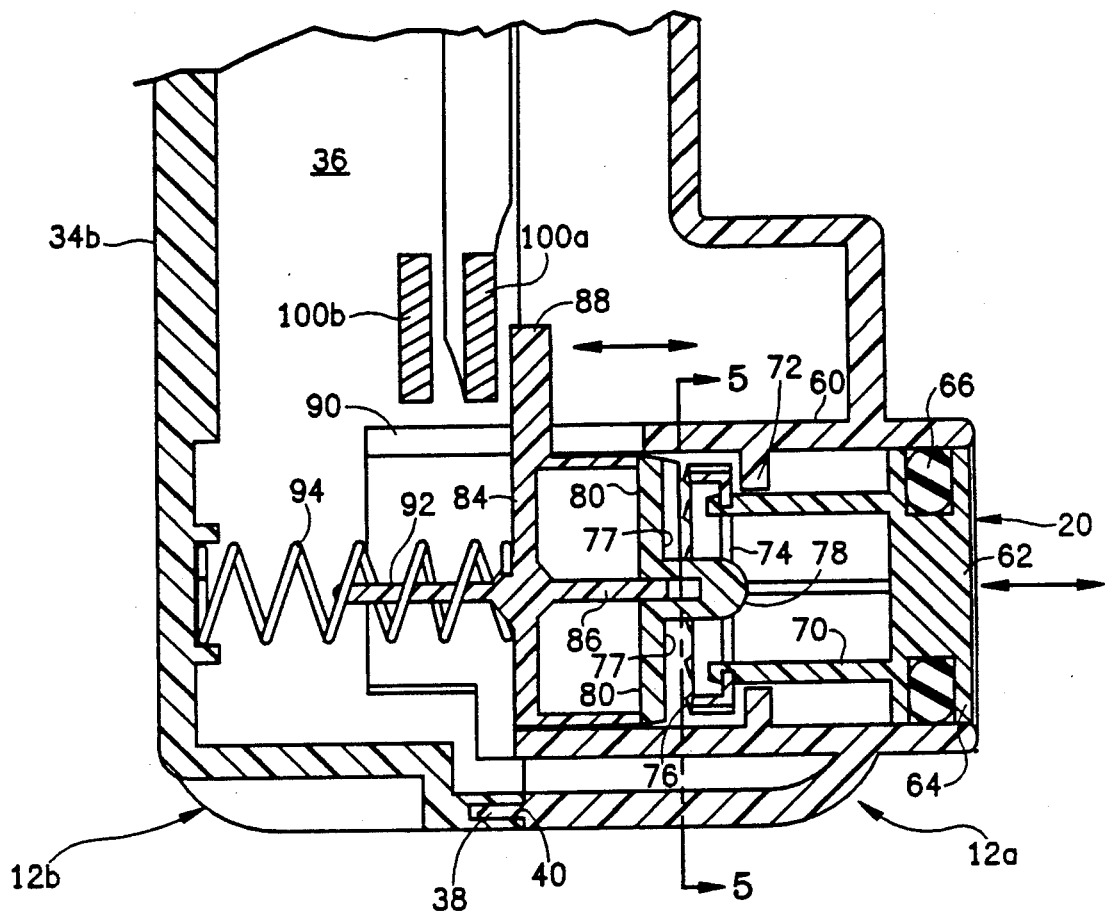
FIG. 4 is an enlarged view of the control switch of the present invention taken along line 4—4 in FIG. 3.
Figure 5:
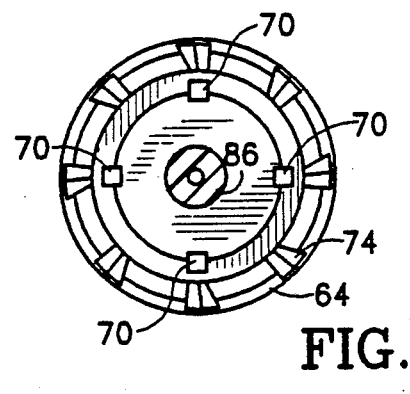
FIG. 5 is a cross-sectional view of the control switch of FIG. 4 taken along line 5—5 in FIG. 4.

Referring now to FIGS. 4 and 5, the individual components of the control switch may be more fully appreciated. Extending rearwardly from the button 62 are four posts 70 which extend through an opening in an annular ridge 72 which is disposed radially about the perimeter of the switch housing 60. The four posts 70 are notched at their ends to compatibly receive a radially-notched crown 74 about all four ends. A forward surface (i.e., the surface facing a user of the device 10) of the crown 74 bears against the rearward surface of the annular ridge 72 when the button 62 is released thereby maintaining the control switch 20 within control switch housing 60 in opposition to the forces of a spring (described below).

The crown 74 has a plurality of first peaks 76 which accept a plurality of second peaks 77 integral with a wheel 78. The wheel 78 has four spokes 80 extending radially outward which slidably engage channels (shown more clearly in FIG. 5) provided about the interior perimeter of switch housing 60. The wheel 78 is configured to rotate a one-quarter turn within the switch housing 60 every time the button 62 is pushed inwardly. With each ¼ turn, each spoke 80 of the wheel 78 are directed out of one channel and received by the next adjacent channel. The channels are alternatively configured so that every other channel is provided with a stop surface (not shown) against which the four spokes can rest. When the button 62 is pressed inwardly from an "OFF" position, the wheel 78 rotates ¼ turn and comes to rest on the stop surfaces which prevent the button 62 from returning completely to its initial "OFF" position. When the button 62 is pressed inwardly a second time, the wheel 78 rotates and additional ¼ turn and avoids the stop surfaces, permitting the button 62 to return completely to its initial "OFF" position. Operation of the control switch 20 proceeds in this manner, with the button 62 being pressed inwardly to an "ON" and "OFF" position.

Adjacent the wheel 78 is a spindle 84 having an axle portion 86 which extends into the wheel 78. Extending radially outward from the spindle 84 is a contact arm 88 which slidably engages a slot 90 in the switch housing 60. As the button 62 is pressed inwardly between its "ON" and "OFF" positions, the contact arm 88 slides within the slot 90 so that it is in a first position when the control switch 20 is off and is in a second position when the control switch 20 is on, the first position being forward of the second position. At the opposite side of axle 86 is a guide 92 which is slidably received by a linear compression spring 94 positioned within the interior 36 of rear panel 34b. The spring 94 provides continual compression against the rear portion of control switch 20 so as to permit the control switch 20 to return to its "OFF" position.

The contact arm 88 is movably positioned within the slot 90 so to engage a first of two electrical contact bars 100a and 100b, positioned within recepticals 102 on the rear panel 34b, when the control switch is pushed to the "ON" position. The first contact bar 100a is in electrical communication with one or more batteries 104 while the second contact bar 100b (partially shown) is in electrical communication with one of the wires 50 of the motor 48. The contact bars 100a and 100b act as a switch, completing an electrical circuit necessary to operate the motor 48 when the control switch 20 is in an "ON" position and breaking the electrical circuit when then control switch 20 is in an "OFF" position. When the button 62 is pressed inwardly from the "OFF" position, the contact arm 88 engages the first contact bar 100a and pushes it into contact with the second contact bar 100b thereby completing the circuit. While the control switch 20 is in the "ON" setting, the two contact bars 100a, 100b are maintained in electrical contact so that the motor 48 continuously drives the rotation of reflective plate 16. When the control switch 20 is in the "OFF" setting, the two contact bars 100a, 100b are released from engagement, thereby cutting power to the motor 48.

The batteries 104 of the device 10 are housed in a battery compartment 106 integral with the rear panel 34b. In the preferred embodiment, the battery compartment 106 extends laterally across the rear panel 34b and is sufficiently long to accept two "C" sized batteries. The batteries 104 are insertable and removable through a compartment access door 108 which may be locked in a closed position to secure the batteries 104 in place during use. The battery compartment 106 is preferably hidden from view when the bracket 26 (not shown) is retracted against the outer face of rear panel 34b. As such, when the device 10 is positioned as shown in FIG. 2, the device must be first removed from the vertical surface 24 and the bracket 26 must be pivoted outwardly in order to access the battery compartment 106.

At the upper portion of rear panel 34b is a pin housing 110 integral with the rear panel 34b and which receives a support pin 112. The support pin 112 extends rearwardly out of the pin housing 110 to snugly engage an aperture 114 in suction cup 22. By using a mechanical connector 116, such as a bolt, the support pin 112 may be tightly secured within the pin housing 110, thereby tightly securing the suction cup 22 to the rear of the device 10.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A portable revolving shower mirror, comprising:
    a water resistent housing comprising first and second panels connectable about a perimeter of said first and second panels so as to provide a water resistent connection, said first panel having a circular recess therein;
    a mirror having reflective material over a substantially entire portion of an outwardly-directed surface of said mirror, said mirror having a center of rotation about which said mirror can rotate at angular velocities greater than one thousand revolutions per minute:
    a cover mounted about the recess of the water resistent housing for supporting the mirror, an outer surface of said mirror positioned flush with, or extending outwardly from, an outer-most surface of said water resistent housing;
    a motor disposed within a motor compartment, said motor compartment being constructed integral with the first panel, said motor having a drive shaft extending outwardly through the recess of said front panel, said drive shaft being engagable with an opening in the mirror cover so as to rotate said mirror cover when said motor is actuated;
    a battery for supplying power to the motor;
    a control switch disposed within the water resistent housing and alternatively positionable between an "ON" and "OFF" position so as to actuate the motor, said control switch having a gasket to provide a water resistent seal; and
    support means positioned about an exterior surface of the second panel for externally supporting said housing in a fixed position on a substantially flat surface.

2. The device of claim 1, wherein the mirror has a flat reflective surface.

3. The device of claim 1, wherein the mirror has a concave reflective surface.

4. The device of claim 1, wherein the support means is a suction cup mounted to the rear surface of said water resistent housing for supporting said device from a bathroom wall.

5. The device of claim 1, wherein the support means is a hinged bracket for supporting said device on a substantially horizontal surface, said bracket outwardly pivotable from the housing.

6. A portable revolving shower mirror, comprising:
    a water resistent housing having a recess in a front portion thereof;
    reflective means disposed in the recess;
    driving means disposed within the housing and linked to the reflective means for rotating said reflective means relative to said housing;
    control means for actuating the drive means; and
    a suction cup mounted to the rear surface of the water resistent housing for supporting the housing from a bathroom wall.

7. A portable revolving shower mirror, comprising:
    a water resistent housing having a recess in a front portion thereof;
    reflective means disposed in the recess;
    driving means disposed within the housing and linked to the reflective means for rotating said reflective means relative to said housing;
    control means for actuating the drive means; and
    a hinged bracket for supporting the housing on a substantially horizontal surface, said bracket being outwardly pivotable from said housing.

8. A method of removing moisture from a make up-/shaving mirror in a high-moisture environment, said method comprising the steps of:
    providing a portable water resistent device having a battery-powered electric motor, a drive shaft linked to a rotatable reflective surface, and a support mounted to the rear surface of said device;
    supporting the portable water resistent device in a desired fixed location and in a self-sustaining position within the high-moisture environment by attaching a suction cup to a substantially vertical surface;
    actuating the battery-powered electric motor, and rotating the reflective surface to centrifugally remove moisture accumulation on the reflective surface.

9. A method of removing moisture from a make up/shaving mirror in a high-moisture environment, said method comprising the steps of:

providing a portable water resistent device having a battery-powered electric motor, a drive shaft linked to a rotatable reflective surface, and a support mounted to the rear surface of said device;

supporting the portable water resistent device in a desired fixed location and in a self-sustaining position within the high-moisture environment by outwardly pivoting a hinged bracket mounted on a rear portion of said device away from said device and placing said device on a substantially horizontal surface;

actuating the battery-powered electric motor, and rotating the reflective surface to centrifugally remove moisture accumulation on the reflective surface.

* * * * *